US009868876B2

(12) United States Patent
Pratt et al.

(10) Patent No.: US 9,868,876 B2
(45) Date of Patent: Jan. 16, 2018

(54) COATING COMPOSITION

(71) Applicant: Imerys Minerals Limited, Par Cornwall (GB)

(72) Inventors: Gareth Pratt, Newquay Cornwall (GB); Peter Biza, Tournefeuille (FR)

(73) Assignee: Imerys Minerals Limited, Par Cornwall (GB)

( * ) Notice: Subject to any disclaimer, the term of this patent is extended or adjusted under 35 U.S.C. 154(b) by 0 days.

(21) Appl. No.: 15/311,005

(22) PCT Filed: May 15, 2015

(86) PCT No.: PCT/GB2015/051444
§ 371 (c)(1),
(2) Date: Nov. 14, 2016

(87) PCT Pub. No.: WO2015/173588
PCT Pub. Date: Nov. 19, 2015

(65) Prior Publication Data
US 2017/0081543 A1    Mar. 23, 2017

(30) Foreign Application Priority Data
May 15, 2014 (GB) .................................. 1408675.5

(51) Int. Cl.
| C09D 123/08 | (2006.01) |
| C09D 7/12 | (2006.01) |
| C08K 3/34 | (2006.01) |
| C08K 7/00 | (2006.01) |
| C08K 7/04 | (2006.01) |
| C08K 7/10 | (2006.01) |
| D21H 19/40 | (2006.01) |
| D21H 19/44 | (2006.01) |
| D21H 19/56 | (2006.01) |
| C09D 109/06 | (2006.01) |
| D21H 19/58 | (2006.01) |
| D21H 19/60 | (2006.01) |

(52) U.S. Cl.
CPC ........ C09D 123/0869 (2013.01); C08K 3/346 (2013.01); C08K 7/00 (2013.01); C08K 7/04 (2013.01); C08K 7/10 (2013.01); C09D 7/1216 (2013.01); C09D 7/1291 (2013.01); C09D 109/06 (2013.01); D21H 19/40 (2013.01); D21H 19/44 (2013.01); D21H 19/56 (2013.01); D21H 19/58 (2013.01); D21H 19/60 (2013.01); C08K 3/34 (2013.01); C08K 2201/008 (2013.01); C08K 2201/016 (2013.01)

(58) Field of Classification Search
CPC ............ C09D 123/0869; C09D 109/06; D21H 19/40; D21H 19/58; C08K 3/34; C08K 3/346; C08K 2201/008
USPC ...................................................... 428/537.5
See application file for complete search history.

(56) References Cited

U.S. PATENT DOCUMENTS

| 5,776,604 | A | 7/1998 | Lu et al. | |
| 6,486,252 | B1 | 11/2002 | Barbee et al. | |
| 6,599,622 | B1 | 7/2003 | Chu et al. | |
| 8,513,144 | B2 | 8/2013 | Ting et al. | |
| 2003/0085012 | A1 | 5/2003 | Jones et al. | |
| 2009/0098395 | A1* | 4/2009 | Lu ........................... | B05D 7/04 428/454 |
| 2011/0293957 | A1* | 12/2011 | Johansson ................. | C08L 3/02 428/533 |
| 2012/0121893 | A1* | 5/2012 | Iyengar .................. | C09J 7/0228 428/327 |
| 2013/0280545 | A1* | 10/2013 | Husband ................ | D21H 17/25 428/464 |

FOREIGN PATENT DOCUMENTS

| EP | 1 040 081 B1 | 7/2003 |
| EP | 1 521 708 B1 | 1/2008 |
| JP | 2000-80593 A | 3/2000 |
| WO | WO 99/00248 | 1/1999 |
| WO | WO 00/78855 A1 | 12/2000 |
| WO | WO 2008/141771 A1 | 11/2008 |
| WO | WO 2010/042162 A1 | 4/2010 |
| WO | WO 2013/017857 A1 | 2/2013 |
| WO | WO 2014/062476 A1 | 4/2014 |

OTHER PUBLICATIONS

International Search Report and Written Opinion dated Jul. 23, 2015, in International PCT Application No. PCT/GB2015/051444, filed May 15, 2015.
Bollström, Roger et al., "Barrier Properties Created by Dispersion Coating", Tappi Journal, vol. 12, No. 4, Apr. 2013, pp. 45-51.
Barrier Coatings for Packaging—Final Report Aleks Tedstone; "Packaging Material"; pp. 1-45.

* cited by examiner

*Primary Examiner* — Leszek Kiliman
(74) *Attorney, Agent, or Firm* — Finnegan, Henderson, Farabow, Garrett & Dunner LLP

(57) ABSTRACT

A coating composition comprising a polymer, such as a copolymer comprising alkylene monomers and unsaturated acid monomers, and at least one phyllosilicate, a product coated with said composition, a method of making said coating compositions and a method of making said coated products.

20 Claims, No Drawings

US 9,868,876 B2

COATING COMPOSITION

CLAIM FOR PRIORITY

This application is a U.S. national phase entry under 35 U.S.C. §371 from PCT International Application No. PCT/GB2015/051444, filed May 15, 2015, which claims the benefit of priority of GB Application No. 1408675.5, filed May 15, 2014, both of which are incorporated herein by reference.

TECHNICAL FIELD

The present invention relates generally to coating compositions and products coated with said coating compositions. The present invention also relates to a method of making said coating compositions and a method of making said coated products. In certain embodiments, the present invention relates to paper coating compositions and coated paper.

BACKGROUND OF THE INVENTION

Coating compositions are used widely to coat numerous types of materials which are used for numerous applications. For example, coating compositions may be used to coat materials which are used to package goods such as food and beverage products, electronic products, automotive products, medical/pharmaceutical products and cosmetic products. The coated material may, for example, be paper or the like.

In some applications it is desirable that the coating composition reduces or prevents the permeation of substrates such as gas, vapour or liquid through the coated material. For example, it may be desirable that the coating composition reduces or prevents the permeation of water through the coated material. In some applications, it is desirable that the coating compositions may be used as heat-seal coatings.

Coating compositions generally comprise one or more binders such as natural and synthetic polymers (e.g. latex or polyethylene), waxes and resins. It is often desirable to reduce the amount of certain binders used in coating compositions, for example for environmental and/or cost reasons.

Coating compositions may also comprise one or more inorganic particulate material(s). The inorganic particulate material(s) may, for example, contribute to the barrier properties of the coating composition. Alternatively, the presence of inorganic particulate material(s) may reduce the amount of other components (e.g. binder) in the coating composition, for example without having a significantly detrimental effect on the barrier properties of the composition. The inorganic particulate material(s) may also, for example, affect the properties of the coated material. For example, the inorganic particulate material(s) may also affect the colour, opacity, brightness, gloss or hardness of the coated material (e.g. paper).

It is therefore desirable to provide alternative and/or improved coating compositions. It may, for example, be desirable to provide coating compositions which have improved barrier properties, which may in turn allow a reduced coating weight to be used. It may, for example, be desirable to provide coating compositions which contain a reduced amount of binder. For example, it may also be desirable to provide coating compositions which are more environmentally favourable, for example are more easily recyclable.

SUMMARY OF THE INVENTION

In accordance with a first aspect of the present invention, there is provided a coating composition comprising a polymer, for example a copolymer comprising alkylene monomers and unsaturated acid monomers (e.g. an ethylene acrylic acid copolymer), and at least one phyllosilicate. In certain aspects, the at least one phyllosilicate has a shape factor equal to or greater than about 40.

In accordance with a further aspect of the present invention, there is provided a coating composition comprising a polymer and at least one phyllosilicate, wherein the coating composition has a moisture vapour transmission rate (MVTR) which is less than about 150 gsm/day when measured according to TAPPI T464 at 37.8° C. and 90% relative humidity, using an approximately 13 gsm coatweight of said coating composition. In certain aspects, the at least one phyllosilicate has a shape factor equal to or greater than about 40.

The coating compositions of any aspect of the present invention may be used to make coated products. Thus, in accordance with a second aspect of the present invention there is provided a product coated with a coating composition comprising a polymer, for example a copolymer comprising alkylene monomers and unsaturated acid monomers (e.g. an ethylene acrylic acid copolymer), and at least one phyllosilicate. In certain aspects, the at least one phyllosilicate has a shape factor equal to or greater than about 40.

In accordance with a third aspect of the present invention, there is provided a method of making a coating composition comprising combining a polymer, for example a copolymer comprising alkylene monomers and unsaturated acid monomers (e.g. an ethylene acrylic acid copolymer), and at least one phyllosilicate. In certain aspects, the at least one phyllosilicate has a shape factor equal to or greater than about 40.

In accordance with a fourth aspect of the present invention, there is provided a method of making a coated product comprising providing a product to be coated and coating the product with a coating composition comprising a polymer, for example a copolymer comprising alkylene monomers and unsaturated acid monomers (e.g. an ethylene acrylic acid copolymer), and at least one phyllosilicate. In certain aspects, the at least one phyllosilicate has a shape factor equal to or greater than about 40.

In certain embodiments of any aspect of the present invention, the polymer is selected from styrene butadiene, ethylene acrylic acid, polyethylene terephthalate, styrene acrylic latex and combinations thereof.

In certain embodiments of any aspect of the present invention, the alkylene monomers are ethylene monomers. In certain embodiments of any aspect of the present invention, the unsaturated acid monomers are acrylic acid monomers. Thus, in certain embodiments of any aspect of the present invention, the copolymer is an ethylene acrylic acid (EAA) copolymer.

In certain embodiments of any aspect of the present invention, at least 30% of the acid groups present on the polymer, e.g. copolymer, are neutralized.

In certain embodiments of any aspect of the present invention, the coating composition is an aqueous dispersion.

In certain embodiments of any aspect of the present invention, the at least one phyllosilicate has a shape factor equal to or greater than about 50. In certain embodiments, the at least one phyllosilicate has a shape factor equal to or greater than about 75. In certain embodiments, the at least one phyllosilicate has a shape factor equal to or greater than about 100.

In certain embodiments of any aspect of the present invention, the at least one phyllosilicate is talc. In certain embodiments of any aspect of the present invention, the at least one phyllosilicate is kaolin.

In certain embodiments of any aspect of the present invention, the copolymer is present in the coating composition in an amount ranging from about 10% to about 80% by weight of the dry composition. In certain embodiments, the copolymer is present in the coating composition in an amount ranging from about 10% to about 60% by weight of the dry composition.

In certain embodiments of any aspect of the present invention, the at least one phyllosilicate is present in the coating composition in an amount ranging from about 20% to about 90% by weight of the dry composition. In certain embodiments, the at least one phyllosilicate is present in the coating composition in an amount ranging from about 40% to about 90% by weight of the dry composition.

In certain embodiments of any aspect of the present invention, the coating composition has a moisture vapour transmission rate (MVTR) which is at least 1.5 times lower than the MVTR of a corresponding coating composition which does not comprise the at least one phyllosilicate, wherein MVTR is measured at 37.8° C. and 90% relative humidity. In certain embodiments, the coating composition has a MVTR which is at least 2.5 times lower than the MVTR of a corresponding coating composition which does not comprise the at least one phyllosilicate, wherein MVTR is measured at 37.8° C. and 90% relative humidity. In certain embodiments of any aspect of the present invention, the coating composition has a MVTR which is at least 3.5 times lower than the MVTR of a corresponding coating composition which does not comprise the at least one phyllosilicate, wherein MVTR is measured at 37.8° C. and 90% relative humidity. In certain embodiments, the coating composition has a MVTR which is at least 4 times lower than the MVTR of a corresponding coating composition which does not comprise the at least one phyllosilicate, wherein MVTR is measured at 37.8° C. and 90% relative humidity.

In certain embodiments of any aspect of the present invention, the coating composition has a moisture vapour transmission rate (MVTR) which is less than about 150 gsm/day or less than about 100 gsm/day when measured according to TAPPI T464 at 37.8° C. and 90% relative humidity, using an approximately 13 gsm coatweight of said coating composition. In certain embodiments of any aspect of the present invention, the coating composition has a moisture vapour transmission rate (MVTR) which is less than about 150 gsm/day when measured according to TAPPI T464 at 37.8° C. and 90% relative humidity, using an approximately 13 gsm coatweight of said coating composition on a woodfree base paper, wherein the base paper is pre-coated with a pre-coating composition comprising calcium carbonate having at least 60% of particles smaller than 2 μm and less than 15 pph latex, and the pre-coated paper has a Cobb value of less than 60 grams of water imbibed per m² when measured according to TAPPI T441 duration 1 minute. In certain embodiments of any aspect of the present invention, the coating composition has a MVTR which is less than about 100 gsm/day when measured according to TAPPI T464 at 37.8° C. and 90% relative humidity, using an approximately 13 gsm coatweight of said coating composition on a woodfree base paper, wherein the base paper is pre-coated with a pre-coating composition comprising calcium carbonate having at least 60% of particles smaller than 2 μm and less than 15 pph latex, and the pre-coated paper has a Cobb value of less than 60 grams of water imbibed per m² when measured according to TAPPI T441 duration 1 minute.

In certain embodiments of any aspect of the present invention, the coating composition has a moisture vapour transmission rate (MVTR) which is less than about 40 gsm/day when measured according to TAPPI T448 at 23° C. and 50% relative humidity, using an approximately 13 gsm coatweight on a woodfree base paper, wherein the base paper is pre-coated with a pre-coating composition comprising calcium carbonate having at least 60% of particles smaller than 2 μm and less than 15 pph latex, and the pre-coated paper has a Cobb value of less than 60 grams of water imbibed per m² when measured according to TAPPI T441 duration 1 minute.

In certain embodiments of any aspect of the present invention, the coating composition has a Cobb value of less than about 30 gsm when measured according to TAPPI T441 duration 1 minute, using an approximately 9 gsm coatweight of the coating composition.

In certain embodiments of any aspect of the present invention, the MVTR or Cobb value is measured using a base paper that is coated with a pre-coating composition, wherein the pre-coating composition has a coatweight equal to or greater than about 12 gsm.

In certain embodiments of any aspect of the present invention, the coated product is a coated paper product.

In certain embodiments of any aspect of the present invention, the coating weight (coatweight) is equal to or less than about 15 gsm. In certain embodiments of any aspect of the present invention, the coating weight is equal to or less than about 10 gsm. In certain embodiments of any aspect of the present invention the coating weight is equal to or less than about 5 gsm.

In certain embodiments of any aspect of the present invention, the coated product has a moisture vapour transmission rate (MVTR) which is at least about 1.5 times lower, for example at least 2.5 times lower, for example at least 3.5 times lower than the MVTR of a corresponding product coated with a corresponding coating composition which does not comprise the at least one phyllosilicate, wherein MVTR is measured at 37.8° C. and 90% relative humidity. In certain embodiments, the coated product has a moisture vapour transmission rate (MVTR) which is at least about 4 times lower than the MVTR of a corresponding product coated with a corresponding coating composition which does not comprise the at least one phyllosilicate, wherein MVTR is measured at 37.8° C. and 90% relative humidity.

In certain embodiments of any aspect of the present invention, the coated product has a moisture vapour transmission rate (MVTR) which is less than about 150 gsm/day, for example less than about 100 gsm/day when measured according to TAPPI T464 at 37.8° C. and 90% relative humidity and using an approximately 13 gsm coatweight.

In certain embodiments of any aspect of the present invention, the coated product has a moisture vapour transmission rate (MVTR) which is less than about 40 gsm/day when measured according to TAPPI T448 at 23° C. and 50% relative humidity and using an approximately 13 gsm coatweight.

Certain embodiments of any aspect of the present invention, may provide one or more of the following advantages:
  improved barrier properties (e.g. improved moisture vapour transmission rates and/or improved Cobb value);

improved heat-seal properties;
reduced coating weight (e.g. reduced coating weight on thinner papers);
reduced amount of binder in the coating;
reduced amount of surfactant in the coating
a more environmentally favourable coating;
a coating which can be applied as part of the normal paper preparation without requiring further equipment such as extrusion equipment.

The details, examples and preferences provided in relation to any particular one or more of the stated aspects of the present invention apply equally to all aspects of the present invention. Any combination of the embodiments, examples and preferences described herein in all possible variations thereof is encompassed by the present invention unless otherwise indicated herein, or otherwise clearly contradicted by context.

DETAILED DESCRIPTION OF THE INVENTION

The present invention is based on the surprising finding that a coating composition comprising a polymer, such as a copolymer comprising alkylene monomers and unsaturated acid monomers, and at least one platy phyllosilicate demonstrates improved properties in comparison to a coating composition comprising a polymer, such as a copolymer comprising alkylene monomers and unsaturated acid monomers, but not comprising the at least one platy phyllosilicate. The present invention is also based on the further surprising finding that coating compositions comprising a polymer, such as a copolymer comprising alkylene monomers and unsaturated acid monomers, and at least one platy phyllosilicate work synergistically to provide a greater improvement in properties, such as moisture vapour transmission, in comparison to the improvement shown for coating compositions comprising different binders with the at least one phyllosilicate or coating compositions that do not comprise the at least one platy phyllosilicate.

The various aspects of the present invention may be further advantageous in that the coating compositions disclosed herein may be water-based. In addition, the various aspects of the present invention may be advantageous in that paper coated with these coating compositions, for example comprising ethylene acrylic acid copolymers, are more easily recyclable than paper provided with wax coatings or polyethylene coatings. The various aspects of the present invention may further be advantageous in that they use binders that are suitable for use in food packaging (e.g. wax-free binders). Further, the coating compositions disclosed herein may be more convenient in that a converter may have coating equipment but no extrusion equipment.

Coating Compositions

There is provided herein a coating composition comprising a polymer and at least one phyllosilicate. There is provided herein a coating composition comprising a copolymer comprising alkylene monomers and unsaturated acid monomers and at least one phyllosilicate. The polymer (e.g. copolymer) and phyllosilicate may be as defined herein.

In one aspect, there is provided herein a coating composition comprising, consisting essentially of or consisting of a polymer, for example a copolymer comprising, consisting essentially of or consisting of alkylene monomers and unsaturated acid monomers, and at least one platy phyllosilicate, for example a phyllosilicate having a shape factor equal to or greater than about 40.

The coating composition may be an aqueous dispersion/suspension. The solids content of the coating composition may suitably be as high as possible whilst still giving a suitably fluid composition which may be used in coating. The solids content of the coating composition may range from about 10% to about 70% by weight of the composition. For example, the solids content of the composition may be from about 10% to about 60%, for example from about 10% to about 50% by weight of the composition. In certain embodiments, the solids content of the composition may be from about 20% to about 60%, for example from about 30% to about 60% by weight of the composition. In certain embodiments, the solids content of the composition may be from about 35% to about 55%, for example from about 45% to about 55%, for example about 55%, by weight of the composition. For example, the solids content of the composition may be from about 40% to about 50%, for example about 45% by weight of the composition. After application of the aqueous coating composition to the desired product, the coating composition may be allowed to dry. Thus, in certain embodiments, the coating composition may be in the form of a dry residue comprising a polymer, for example a copolymer comprising alkylene monomers and unsaturated acid monomers, and at least one phyllosilicate.

The coating compositions disclosed herein may, for example, be barrier coating compositions. For example, the coating compositions may reduce or prevent the permeation of gases and/or vapours and/or liquids through the coating. For example, the coating compositions may reduce or prevent the permeation of water through the coating.

The coating composition may, for example, have a moisture vapour transmission rate (MVTR) which is at least about 1.5 times lower than that of a corresponding coating composition which does not comprise the at least one phyllosilicate when MVTR is measured at high temperature and high humidity, for example 37.8° C. and 90% relative humidity. For example, the coating composition may have a MVTR which is at least about 2 times lower, for example at least about 2.5 times lower, for example at least about 3 times lower than that of a corresponding coating composition which does not comprise the at least one phyllosilicate when MVTR is measured at high temperature and high humidity, for example 37.8° C. and 90% relative humidity. For example, the coating composition may have a MVTR which is at least about 3.5 times lower than that of a corresponding coating composition which does not comprise the at least one phyllosilicate when MVTR is measured at high temperature and high humidity, for example 37.8° C. and 90% relative humidity. The coating composition may, for example, have a moisture vapour transmission rate (MVTR) which is at least about 4 times lower than that of a corresponding coating composition which does not comprise the at least one phyllosilicate when MVTR is measured at high temperature and high humidity, for example 37.8° C. and 90% relative humidity. For example, the coating composition may have a moisture vapour transmission rate (MVTR) which is at least about 4.5 times lower than that of a corresponding coating composition which does not comprise the at least one phyllosilicate when MVTR is measured at high temperature and high humidity, for example 37.8° C. and 90% relative humidity.

The "corresponding composition which does not comprise the at least one phyllosilicate" may, for example, be substantially identical, for example identical, to the composition to which it is being compared except that it does not comprise any phyllosilcate. For example, the "corresponding composition which does not comprise the at least one phyllosilicate" may be substantially identical, for example identical, to the composition to which it is being compared except that it comprises a phyllosilicate that does not have a shape factor equal to or greater than about 40. The "corresponding composition which does not comprise the at least one phyllosilicate" may, for example, be provided at the same coatweight as the composition to which it is being compared.

The coating composition may have a moisture vapour transmission rate (MVTR) which is less than about 150 gsm/day when measured at high temperature and high humidity, for example 37.8° C. and 90% relative humidity. For example, the coating composition may have a MVTR which is less than about 120 gsm/day, for example less than about 100 gsm/day when measured at high temperature and high humidity, for example 37.8° C. and 90% relative humidity. For example, the coating composition may have a MVTR which is less than about 80 gsm/day, for example less than about 60 gsm/day, for example less than about 50 gsm/day when measured at high temperature and high humidity, for example 37.8° C. and 90% relative humidity. For example, the coating composition may have a MVTR which is less than about 45 gsm/day, for example less than about 40 gsm/day, for example less than about 35 gsm/day when measured at high temperature and high humidity, for example 37.8° C. and 90% relative humidity. For example, the coating composition may have a MVTR which is less than about 30 gsm/day, for example less than about 25 gsm/day, for example less than about 20 gsm/day when measured at high temperature and high humidity, for example 37.8° C. and 90% relative humidity.

Unless otherwise stated, the moisture vapour transmission rate (MVTR) measured at high temperature and high humidity (e.g. 37.8° C. and 90% relative humidity) is measured according to TAPPI T464. This may sometimes be referred to as jungle or tropical moisture vapour transmission rate. The MVTR at high temperature and high humidity may be measured at 37.8° C. and 90% relative humidity. The coatweight of the coating may be equal to or less than about 13 gsm. The substrate used may be a woodfree base paper. The base paper may be pre-coated with a pre-coating composition. The coatweight of the pre-coating composition may be equal to 12 gsm or may be greater than 12 gsm. The pre-coating composition may comprise calcium carbonate having at least 60% of particles smaller than 2 µm and less than 15 pph latex, and/or the pre-coated paper may have a Cobb value of less than 60 grams of water imbibed per $m^2$ when measured according to TAPPI T441 duration 1 minute.

The coating composition may have a moisture vapour transmission rate (MVTR) of less than about 40 gsm/day when measured at standard temperature and humidity, for example 23° C. and 50% relative humidity. For example, the coating composition may have a MVTR of less than about 35 gsm/day, for example less than about 30 gsm/day, for example less than about 25 gsm/day when measured at standard temperature and humidity, for example 23° C. and 50% relative humidity.

Unless otherwise stated, the MVTR measured at standard temperature and humidity (e.g. 23° C. and 50% relative humidity) is measured according to TAPPI T448. This may sometimes be referred to as standard MVTR. The MVTR at standard temperature and humidity may be measured at 23° C. and 50% relative humidity. The coatweight of the coating may be equal to or less than about 13 gsm. The substrate used may be a woodfree base paper. The base paper may be pre-coated with a pre-coating composition. The coatweight of the pre-coating composition may be equal to 12 gsm or may be greater than 12 gsm. The pre-coating composition may comprise calcium carbonate having at least 60% of particles smaller than 2 µm and less than 15 pph latex, and/or the pre-coated paper may have a Cobb value of less than 60 grams of water imbibed per $m^2$ when measured according to TAPPI T441 duration 1 minute. The coating composition may have a Cobb value of less than about 30 gsm. For example, the coating composition may have a Cobb value equal to or less than about 25 gsm, for example equal to or less than about 20 gsm, for example equal to or less than about 15 gsm, for example equal to or less than about 10 gsm, for example equal to or less than about 5 gsm. The coating composition may, for example have a Cobb value ranging from about 0 gsm to about 30 gsm, for example from about 1 gsm to about 30 gsm, for example from about 2 gsm to about 30 gsm, for example from about 5 gsm to about 30 gsm.

"Cobb value" as used herein is defined as the water absorption (in weight of water per unit area) of a sample. The procedure for determining the Cobb value is generally: 1) weigh the sample; 2) place the sample in a holder with the appropriate ring; 3) fill the ring with water; 4) wait for a period of time; 5) pour off water; and 6) weigh the sample. The Cobb value is calculated by subtracting the initial weight of the sample from the final weight of the sample and then dividing by the area of the sample covered by the water.

Unless otherwise stated, the Cobb value is measured according to TAPPI T441 duration 1 minute. The coatweight of the coating may be equal to or less than about 9 gsm. The substrate used may be a woodfree base paper. The base paper may be pre-coated with a pre-coating composition. The coatweight of the pre-coating composition may be equal to 12 gsm or may be greater than 12 gsm. The pre-coating composition may comprise calcium carbonate having at least 60% of particles smaller than 2 µm and less than 15 pph latex. The base paper (e.g. pre-coated paper) may have a Cobb value of less than 60 grams of water imbibed per $m^2$ when measured according to TAPPI T441 duration 1 minute.

Polymer

The polymer used in the coating compositions disclosed herein may, for example, be a water-based polymer. For example, the polymer may be a wax-free polymer. For example, the polymer may be an elastomer. The polymer may, for example, be a copolymer.

The polymer (e.g. copolymer such as ethylene acrylic acid (EAA) copolymer) may be present in the coating composition in an amount ranging from about 10% to about 80% by weight of the dry composition. For example, the polymer (e.g. copolymer such as EAA copolymer) may be present in the composition in an amount ranging from about 10% to about 70%, for example from about 10% to about 60% by weight of the dry composition. For example, the polymer (e.g., copolymer such as EAA copolymer) may be present in the composition in an amount ranging from about 10% to about 50%, for example from about 20% to about 40% by weight of the dry composition.

In certain embodiments, the ratio of polymer (e.g. copolymer such as ethylene acrylic acid (EAA) copolymer) to phyllosilicate (e.g. talc, kaolin or combinations thereof) may range from about 30:70 to about 70:30, for example from about 40:60 to about 60:40, for example from about 45:55 to about 55:45. For example, the ratio of polymer (e.g. copolymer such as ethylene acrylic acid (EAA) copolymer) to phyllosilicate (e.g. talc, kaolin or combinations thereof) may be approximately 50:50 (e.g. 50:50). This may, for example, assist in providing an acceptable or good Cobb value.

The polymer may, for example, be selected from styrene butadiene, ethylene acrylic acid, polyethylene terephthalate, styrene acrylic latex and any combination thereof.

The copolymer used in the coating compositions disclosed herein may, for example, comprise alkylene monomers and unsaturated acid monomers. The copolymer may, for example be an elastomer.

The alkylene monomers may, for example, be selected from the group consisting of ethylene monomers, propylene monomers, butylene monomers, pentylene monomers, styrene monomers and combinations thereof. The alkylene monomers may, for example, be ethylene monomers. The alkylene monomers may, for example, be styrene monomers.

The unsaturated acid monomers may, for example, be ethylenically unsaturated acids. The unsaturated acid monomers may, for example, be selected from acrylic acid monomers, methacrylic acid monomers, itaconic acid monomers, methyl hydrogen maleate monomers, maleic acid monomers, and combinations thereof. The unsaturated acid monomers may, for example, be acrylic acid monomers. The unsaturated monomers may, for example, be terephthalic acid monomers The proportion of unsaturated acid monomers in the copolymer may be at least about 5% by weight of the polymer. For example, the proportion of unsaturated acid monomers in the copolymer may be at least about 8% by weight of the polymer or at least about 10% by weight of the polymer. For example, the proportion of unsaturated acid monomers in the copolymer may be from about 5% to about 30% by weight of the polymer. For example, the proportion of unsaturated acid monomers in the copolymer may be from about 5% to about 25%, for example from about 10% to about 20% by weight of the polymer.

The polymer (e.g. copolymer such as EAA) may further comprise one or more other monomers. For example, the copolymer may further comprise one or more other monomers selected from the group consisting of methyl acrylate monomers, ethyl acrylate monomers, vinyl acetate monomers, vinyl alcohol monomers, vinyl chloride monomers, vinylidene chloride monomers, methyl methacrylate monomers, ethyl methacrylate monomers, acrylamide monomers, styrene monomers, acrylonitrile monomers, and combinations thereof. The copolymer may, for example, further comprise one or more other acrylate monomer.

The one or more other monomers may be present in the copolymer in an amount up to about 20% by weight of the polymer. For example, the one or more other monomers may be present in the copolymer in an amount up to about 15%, for example 10%, for example 8% by weight of the polymer. For example, the one or more other monomers may be present in the copolymer in an amount up to about 5% by weight of the polymer.

The copolymer may, for example, be selected from the group consisting of ethylene/acrylic acid copolymers, ethylene/methacrylic acid copolymers, ethylene/itaconic acid copolymers, ethylene/methyl hydrogen maleate copolymers, ethylene/maleic acid copolymers, ethylene/acrylic acid/methyl methacrylate (ternary) copolymers, ethylene/acrylic acid/ethyl acrylate copolymers, ethylene/methacrylic acid/ethyl acrylate copolymers, ethylene/itaconic acid/methyl methacrylate copolymers, ethylene/methyl hydrogen maleate/ethyl acrylate copolymers, ethylene/acrylic acid/vinyl acetate copolymers, ethylene/methacrylic acid/vinyl acetate copolymers, ethylene/acrylic acid/vinyl alcohol copolymers, ethylene/propylene/acrylic acid copolymers, ethylene/acrylamide/acrylic acid copolymers, ethylene/styrene/acrylic acid copolymers, ethylene/methacrylic acid/acrylonitrile copolymers, ethylene/fumaric acid/vinyl methyl ether copolymers, ethylene/vinyl chloride/acrylic acid copolymers, ethylene/vinylidene chloride/acrylic acid copolymers, polyethylene/acrylic acid graft copolymers, polyethylene/methacrylic acid graft copolymers, polymerized ethylene/propylene/acrylic acid graft copolymers, and combinations thereof.

Hereinafter, embodiments of the present invention may tend to be discussed in terms of ethylene acrylic acid (EAA) copolymers. However, the invention should not be construed as being limited to such embodiments.

Ethylene acrylic acid (EAA) copolymers are copolymers comprising ethylene monomers ($CH_2=CH_2$) and acrylic acid monomers ($CH_2=CH-CO_2H$).

The proportion of acrylic acid monomers in the EAA copolymer may suitably be at least about 5% by weight of the polymer. For example, the proportion of acrylic acid monomers in the EAA copolymer may be at least about 8% by weight of the polymer, for example at least about 10% by weight of the polymer. The proportion of acrylic acid monomers in the EAA copolymer may range from about 5% to about 30% by weight of the polymer, for example from about 5% to about 25% by weight of the polymer, for example from about 10% to about 20% by weight of the polymer.

The polymer, e.g. copolymer (e.g. EAA copolymer), may be obtained by polymerization, for example by polymerizing alkylene monomers (e.g. ethylene monomers) and unsaturated acid monomers (e.g. acrylic acid monomers). Polymerization may be performed by any suitable method as will be apparent to a person skilled in the art. Alternatively, the polymer, such as a copolymer (e.g. EAA copolymer), may be obtained from a commercial source. The polymer (e.g. copolymers) may, for example, be made from preformed and non-acid polymers by subsequent chemical reaction carried out thereon. For example, the carboxylic acid group may be supplied by grafting a monomer such as acrylic acid or maleic anhydride onto a polymer substrate; carboxylic anhydride, ester, amide, acyl halide, and nitrile groups can be hydrolyzed to carboxylic acid groups. The copolymer may, for example, be obtained by mechanically blending oxidized polyethylene with an acidified EAA polymer (e.g. a fully acidified EAA polymer).

The polymer, e.g. copolymer (e.g. EAA copolymer), may have a melt flow rate range between about 1.0 and about 100 g/10 mins. For example, the polymer, e.g. copolymer (e.g. EAA copolymer), may have a melt flow rate range between about 5 and about 80 g/10 mins, for example from about 10 and about 60 g/10 mins, for example from about 20 and about 50 g/10 mins.

The melt flow rate may be measured according to ASTM D1238 at 190° C. and under 2.16 kg load.

The acid groups on the polymer, e.g. copolymer, may for example, be neutralized. For example, at least about 30% of the acid groups on the polymer, e.g. copolymer, may be neutralized. For example, at least about 40%, for example at least about 45%, for example at least about 50% of the acid groups on the polymer, e.g. copolymer, may be neutralized. For example, between about 30% and about 100% of the acid groups on the polymer, e.g. copolymer, may be neutralized. For example, between about 40% and about 90%, for example between about 45% and about 80%, for example between about 50% and about 75% of the acid groups on the polymer, e.g. copolymer, may be neutralized. The neutralization of the acid groups of the polymer, e.g.

copolymer may, for example, assist in dispersing the polymer in water. The coating composition may be an aqueous dispersion.

The neutralizing agent may, for example, be a salt such as an ammonium salt or alkali metal (e.g. sodium) salt. The neutralizing agent may, for example, be an organic amine. The neutralizing agent may, for example, be a hydroxide salt such as ammonium hydroxide or alkali metal hydroxides (e.g. sodium hydroxide). The coating composition may, for example, comprise a minimal amount of neutralizing alkali whilst still maintaining the polymer in an aqueous dispersion.

When ammonium hydroxide is used as the neutralizing agent, ammonia may be released on drying such that a minimal amount of salt is left in the film. This may, for example, improve water resistance of the film. When alkali metal salts are used as the neutralizing agent, an ionomer may be formed with the copolymer. This may, for example, improve the crystallinity of the film and the moisture vapour barrier improvement of the film.

The polymer, e.g. copolymer (e.g. EAA copolymer), may or may not be in an aqueous dispersion before incorporation into the coating composition.

The acid groups on the polymer, e.g. copolymer may, for example, be non-neutralized. For example, less than about 30% of the acid groups on the polymer, e.g. copolymer, may be neutralized. For example between about 0% and less than about 30% of the acid groups on the polymer, e.g. copolymer, may be neutralized. For example, between about 0% and about 20%, for example between about 0% and about 10%, for example about 0% of the acid groups on the polymer, e.g. copolymer, may be neutralized. The coating composition may, for example, be suitable and/or intended for use as an extrusion coating.

Phyllosilicate

The at least one phyllosilicate may comprise one or more phyllosilicate(s) selected from clays (e.g. kaolin), talc, mica, chlorite, pyrophyllite and serpentine. The at least one phyllosilicate may, for example, comprise talc. The at least one phyllosilicate may, for example, comprise kaolin. For example, the coating composition may comprise a single particulate phyllosilicate mineral. The single particulate phyllosilicate mineral may, for example, be talc or kaolin. Alternatively, the coating composition may comprise a combination of two or more phyllosilicates, for example a combination of kaolin and talc. For example, a mixture of two or more particulate phyllosilicate minerals may be ground together (i.e., co-ground). For example, kaolin and talc may be co-ground to obtain a phyllosilicate mixture for use in the compositions disclosed herein. Hereinafter, certain embodiments of the present invention may tend to be discussed in terms of kaolin or talc. However, the invention should not be construed as being limited to such embodiments.

Talc is particularly suitable for use in the present invention. The talc may comprise, include, consist essentially of, or consist of natural talc particulate or synthetic talc particulate or a mixture of natural talc particulate and synthetic talc particulate.

As used herein, the term "natural talc" means talc derived from a natural resource, i.e., natural talc deposits. Natural talc may be either the hydrated magnesium silicate of formula $Si_4Mg_3O_{10}(OH)_2$, which is arranged as a stack of laminae, or the mineral chlorite (hydrated magnesium aluminium silicate), or a mixture of the two, optionally associated with other minerals, for example, dolomite. Natural talc occurs as rock composed of talc crystals.

As used herein, the term "synthetic talc" means talc that has been synthesized using a man-made synthetic process. The talc used in the present invention may be a macrocrystalline talc or microcrystalline talc.

Kaolin clay may also be used in the present invention. Kaolin clay may be used in a processed or unprocessed form. Kaolin clay may be a processed material derived from a natural source, namely raw natural kaolin clay mineral. The processed kaolin clay may typically contain at least about 50% by weight kaolinite $(Al_2Si_2O_5(OH)_4)$. For example, most commercially processed kaolin clays contain greater than about 75% by weight kaolinite and may contain greater than about 90%, in some cases greater than about 95% by weight of kaolinite.

Kaolin clay used in the present invention may be prepared from the raw natural kaolin clay mineral by one or more other processes which are well known to those skilled in the art, for example by known refining or beneficiation steps.

The phyllosilicate mineral may, for example be bleached with a reductive bleaching agent, such as sodium hydrosulfite. If sodium hydrosulfite is used, the bleached phyllosilicate mineral may optionally be dewatered, and optionally washed and again optionally dewatered, after the sodium hydrosulfite bleaching step.

The phyllosilicate mineral may be treated to remove impurities, e.g. by flocculation, flotation, or magnetic separation techniques well known in the art. Alternatively the phyllosilicate mineral may be untreated in the form of a solid or as an aqueous suspension.

The process for preparing the phyllosilicate may also include one or more comminution steps, e.g., grinding or milling. Light comminution of a coarse phyllosilicate is used to give suitable delamination thereof. The comminution may use beads or granules of a plastic (e.g. nylon), sand or ceramic grinding or milling aid. The coarse phyllosilicate may be refined to remove impurities and improve physical properties using well known procedures. The phyllosilicate may be treated by a known particle size classification procedure, e.g., screening and centrifuging (or both), to obtain particles having a desired particle size distribution.

The phyllosilicate may be calcined or non-calcined. For example, the phyllosilicate may a calcined talc or calcined kaolin. For example, the phyllosilicate may be a non-calcined talc or non-calcined kaolin.

When the phyllosilicate is obtained from naturally occurring sources, it may be that some mineral impurities will inevitably contaminate the ground material. In general, however, the inorganic particulate material used in embodiments of the present invention will contain less than 5% by weight, preferably less than 1% by weight of other mineral impurities.

The phyllosilicate may optionally be surface-modified. For example, the phyllosilicate may be provided with a hydrophobic coating. The coating may, for example, consist of, consist essentially of, or comprise a silane or any salt thereof, for example an organic silane. The coating may, for example, consist of a fatty acid or salt thereof. For example, the phyllosilicate may be coated with stearate. The phyllosilicate may, for example, be coated with an amine.

The level of coating may be about 0.1 to about 10 wt % based on the total weight of the coated particulate mineral additive, for example between about 0.1 and about 3 wt %, for example between about 0.5 or 0.6 or 0.7 or 0.8 and about 2.0 wt % e.g. about 1.5 wt %.

The term "coating" used herein is to be understood broadly, and is not limited, for example, to uniform coatings or to coatings which cover the entire surface area of a particle. Particles in which discrete regions of the surface are modified with a coating will be understood as being coated within the terms of certain embodiments of the present invention.

The phyllosilicate may be present in the coating composition in an amount ranging from about 20% to about 90% by weight of the dry composition. For example, the phyllosilicate may be present in the coating composition in an amount ranging from about 30% to about 90%, for example from about 40% to about 90% by weight of the dry composition. For example, the phyllosilicate may be present in the coating composition in an amount ranging from about 50% to about 90%, for example from about 60% to about 80% by weight of the dry composition.

The phyllosilicate may, for example, be a platy phyllosilicate (as opposed to a blocky phyllosilicate). The phyllosilicate may, for example, have a shape factor equal to or greater than about 40. For example, the phyllosilicate may have a shape factor equal to or greater than about 50, for example equal to or greater than about 60, for example equal to or greater than about 70, for example equal to or greater than about 75. The phyllosilicate may, for example, have a shape factor equal to or greater than about 80, for example equal to or greater than about 90. The phyllosilicate may, for example, have a shape factor equal to or greater than about 100.

The phyllosilicate may, for example, have a shape factor up to about 200. For example, the phyllosilicate may have a shape factor up to about 175, for example up to about 150.

As used herein, "shape factor" is a measure of an average value (on a weight average basis) of the ratio of mean particle diameter to particle thickness for a population of particles of varying size and shape, as measured using the electrical conductivity method and apparatus described in, for example, U.S. Pat. No. 5,576,617 (the contents of which are incorporated herein by reference) and using the equations derived in its specification.

The phyllosilicate may, for example, have a $d_{50}$ between about 0.5 and about 10 µm, for example between about 0.5 µm and about 7.5 µm, for example between about 0.5 µm and about 5 µm. For example, the phyllosilicate may have a $d_{50}$ between about 1.0 and about 3.5 µm. The phyllosilicate may, for example, have a $d_{95}$ of less than about 10 µm. For example, the phyllosilicate may have a $d_{95}$ of less than about 8 µm, for example less than about 7 µm, for example less than about 6 µm, for example less than about 5 µm. The phyllosilicate may, for example, have a $d_{98}$ of less than about 20 µm. For example, the phyllosilicate may have a $d_{98}$ of less than about 15 µm, for example less than about 12 µm, for example less than about 10 µm, for example less than about 8 µm, for example less than about 7 µm, for example less than about 6 µm.

Unless otherwise stated, particle size properties referred to herein for the particulate fillers or materials are as measured in a well known manner by sedimentation of the particulate filler or material in a fully dispersed condition in an aqueous medium using a Sedigraph 5100 machine as supplied by Micromeritics Instruments Corporation, Norcross, Ga., USA (telephone: +17706623620; web-site: www.micromeritics.com), referred to herein as a "Micromeritics Sedigraph 5100 unit". Such a machine provides measurements and a plot of the cumulative percentage by weight of particles having a size, referred to in the art as the 'equivalent spherical diameter' (e.s.d), less than given e.s.d values. The mean particle size $d_{50}$ is the value determined in this way of the particle e.s.d at which there are 50% by weight of the particles which have an equivalent spherical diameter less than that $d_{50}$ value. The $d_{90}$ and $d_{10}$ are the values determined in this way of the particle e.s.d. at which there are 90% and 10% respectively by weight of the particles which have an equivalent spherical diameter less than that $d_{90}$ or $d_{10}$ value.

The phyllosilicate may, for example, have a surface BET area in the range of 1 to 200 m² g⁻¹, for example from 1 to 150 m² g⁻¹, for example from 1 to 100 m² g⁻¹. For example, the phyllosilicate may have a surface BET area up to about 50 m² g⁻¹, for example up to about 25 m² g⁻¹. As used herein, the surface BET area is the specific surface area measured according to DIN ISO 9277.

The phyllosilicate may be an aqueous suspension before incorporation into the coating composition. The aqueous suspension of phyllosilicate may, for example, have a solids content ranging from about 40% to about 90% by weight of the composition. For example, the aqueous suspension of phyllosilicate may have a solids content ranging from about 50% to about 80%, for example from about 50% to about 70%, for example from about 60% to about 70% by weight of the composition. For example, the aqueous suspension of phyllosilicate may have a solids content ranging from about 50% to about 60% by weight of the composition.

The ratio of phyllosilicate (e.g. talc, kaolin or combinations thereof) to polymer (e.g. copolymer such as ethylene acrylic acid (EAA) copolymer) may range from about 70:30 to about 30:70, for example from about 40:60 to about 60:40, for example from about 45:55 to about 55:45. For example, the ratio of phyllosilicate (e.g. talc, kaolin or combinations thereof) to polymer (e.g. copolymer such as ethylene acrylic acid (EAA) copolymer) may be approximately 50:50 (e.g. 50:50). This may, for example, assist in providing an acceptable or good Cobb value.

Further Additives

The coating compositions disclosed herein may suitably comprise one or more further additives selected from, for example, one or more surfactants, one or more diluents, one or more cross-linkers, one or more water retention aids, one or more viscosity modifiers, one or more thickeners, one or more lubricity/calendaring aids, one or more dispersants, one or more wetting agents, one or more antifoamers/defoamers, one or more dry or wet pick improvement additives, one or more dry or wet rub improvement and/or abrasion resistance additives, one or more gloss-ink hold-out additives, one or more optical brightening agents (OBA) and/or fluorescent whitening agents (FWA), one or more dyes, one or more biocides/spoilage control agents, one or more levelling and evening aids, one or more grease and oil resistance additives, one or more water resistance additives, one or more pigments, and any combination thereof. The coating compositions disclosed herein may, for example, comprise a reduced amount of surfactant in comparison to other coating compositions, for example coating compositions comprising different binders and/or different phyllosilicates, for example phyllosilicates that do not have a shape factor equal to or less than about 40.

Crosslinkers may be used in amounts of up to about 5% by weight, and include, for example, glyoxal, melamine formaldehyde resins, ammonium zirconium carbonates.

Water retention aids may be used in amounts up to about 2% by weight, and include, for example, sodium carboxymethyl cellulose, hydroxyethyl cellulose, PVOH (polyvinyl alcohol), starches, proteins, polyacrylates, gums, alginates, polyacrylamide bentonite and other commercially available products sold for such applications.

Viscosity modifiers and/or thickeners may be used in amounts up to about 2% by weight, and include, for example, acrylic associative thickeners, polyacrylates, emulsion, copolymers, dicyanamide, triols, polyoxyethylene ether, urea, sulphate castor oil, polyvinyl pyrrolidone, CMC (carboxymethyl celluloses, for example sodium carboxymethyl cellulose), sodium alginate, xanthan gum, sodium silicate, acrylic acid copolymers, HMC (hydroxymethyl celluloses), HEC (hydroxyethyl celluloses) and others.

Lubricity/calendaring aids may be used in amounts up to about 2% by weight, and include, for example, calcium stearate, ammonium stearate, zinc stearate, wax emulsions, waxes, alkyl ketene dimer, glycols.

Dispersants may be used in amounts up to about 2% by weight, and include, for example, polyelectrolytes such as polyacrylates and copolymers containing polyacrylate species, especially polyacrylate salts (e.g., sodium and aluminium optionally with a group 11 metal salt), sodium hexametaphosphates, non-ionic polyol, polyphosphoric acid, condensed sodium phosphate, non-ionic surfactants, alkanolamine and other reagents commonly used for this function.

Wetting agents may be used in amounts up to about 2% by weight, and include, for example, non-ionic polymeric wetting aids. These wetting aids may, for example, be based on block copolymers.

Antifoamers/defoamers may be used in amounts up to about 1% by weight, and include, for example, blends of surfactants, tributyl phosphate, fatty polyoxyethylene esters plus fatty alcohols, fatty acid soaps, silicone emulsions and other silicone containing compositions, waxes and inorganic particulates in mineral oil, blends of emulsified hydrocarbons and other compounds sold commercially to carry out this function.

Dry or wet pick improvement additives may be used in amounts up to about 2% by weight, and include, for example, melamine resin, polyethylene emulsions, urea formaldehyde, melamine formaldehyde, polyamide, calcium stearate, styrene maleic anhydride and others.

Dry or wet rub improvement and/or abrasion resistance additives may be used in amounts up to about 2% by weight, and include, for example, glyoxal based resins, oxidised polyethylenes, melamine resins, urea formaldehyde, melamine formaldehyde, polyethylene wax, calcium stearate and others.

Gloss-ink hold-out additives may be used in amounts up to about 2% by weight, and include, for example, oxidised polyethylenes, polyethylene emulsions, waxes, casein, guar gum, CMC. HMC, calcium stearate, ammonium stearate, sodium alginate and others.

Optical brightening agents (OBA) and/or fluorescent whitening agents (FWA) may be used in amounts up to about 1% by weight, and include, for example, stilbene derivatives.

Biocides/spoilage control agents may be used in amounts up to about 1% by weight, and include, for example, metaborate, sodium dodecylbenene sulphonate, thiocyanate, organosulphur such as isothiazolinones (e.g. methylisothiazolinone or benzisothiazolinone), sodium benzonate and other compounds sold commercially for this function, e. g., the range of biocide polymers sold by Nalco.

Levelling and evening aids may be used in amounts up to about 2% by weight, and include, for example, non-ionic polyol, polyethylene emulsions, fatty acid, esters and alcohol derivatives, alcohol/ethylene oxide, sodium CMC, HEC, alginates, calcium stearate and other compounds sold commercially for this function.

Grease and oil resistance additives may be used in amounts up to about 2% by weight, and include, for example, oxidised polyethylenes, latex, SMA (styrene maleic anhydride), polyamide, waxes, alginate, protein, CMC, HMC.

Water resistance additives may be used in amounts up to about 2% by weight, and include, for example, oxidised polyethylenes, ketone resin, anionic latex, polyurethane. SMA, glyoxal, melamine resin, urea formaldehyde, melamine formaldehyde, polyamide, glyoxal, stearates and other materials commercially available for this function.

Coalescing agents may be used in amounts up to about 5% by weight, and include, for example, water-insoluble agents such as ester compounds (e.g. ester alcohols and glycol esters).

For all of the above additives, the percentages by weight quoted are based on the dry weight of the composition. Where the additive is present in a minimum amount the minimum amount may be about 0.01% by weight based on the dry weight of pigment.

Coated Products

The coating compositions disclosed herein may be used to coat various materials and substrates to form coated products. Thus, there is provided herein a product coated with a coating composition comprising a polymer, such as a copolymer comprising alkylene monomers and unsaturated acid monomers (e.g. an ethylene acrylic acid copolymer), and at least one phyllosilicate. There is also provided herein a coated substrate having a coating comprising a polymer, such as a copolymer comprising alkylene monomers and unsaturated acid monomers (e.g. an ethylene acrylic acid copolymer), and at least one phyllosilicate.

The coating compositions used to prepare the coated products and substrates of the present invention include all coating compositions disclosed herein, including all embodiments in any combination thereof. For example, the at least one phyllosilicate may be a platy phyllosilicate, for example having a shape factor equal to or greater than 40.

The coating compositions disclosed herein may be used, for example, to coat plastics (e.g. low density polyethylene, polypropylene, polyamides and the like), metals (e.g. foils such as aluminium foil), textiles and paper. The material may, for example, be coloured, treated (e.g. varnished or laminated) or both. The coating of the products may, for example, comprise a dry residue of the coating composition comprising a copolymer comprising alkylene monomers and unsaturated acid monomers (e.g. an ethylene acrylic acid copolymer) and phyllosilicate.

For example, the coating compositions disclosed herein may be used to coat paper, thus producing a coated paper product. The term paper product, as used in connection with the present invention, should be understood to mean all forms of paper, including board, such as, for example, white-lined board and linerboard, cardboard, paperboard, coated board, and the like. There are numerous types of paper, coated or uncoated, which may be made using the compositions disclosed herein, including paper suitable for food packaging, perishable goods other than food, e.g., pharmaceutical products and compositions, books, magazines, newspapers and the like, and office papers. The paper may be calendered or super calendared as appropriate; for example super calendered magazine paper for rotogravure and offset printing may be made according to the present methods. Paper suitable for light weight coating (LWC), medium weight coating (MWC) or machine finished pigmentisation (MFP) may also be made according to the present methods.

The paper substrate may have opposing first and second surfaces. The barrier coating composition may, for example, be coated on the first surface, the second surface, or both. For example, the first surface may be a surface which faces the interior of the paper product when it is formed into a three-dimensional product and the opposing second surface may face the exterior of the paper product. The first and/or second surfaces may or may not have other intermediary coatings or layers between each surface and the barrier coating. The coating composition may, for example, be applied directly to the paper substrate.

The paper may, for example, be a woodfree base paper, wherein the base paper is pre-coated with a pre-coating composition comprising calcium carbonate having at least 60% of particles smaller than 2 µm and less than 15 pph latex, and the pre-coated paper has a Cobb value of less than 60 grams of water imbibed per $m^2$ when measured according to TAPPI T441 duration 1 minute.

The coated products disclosed herein may, for example, have a coating weight between about 3 gsm and about 30 gsm (grams per $m^2$), for example between about 3 gsm and about 28 gsm. The coated product may, for example, have a coating weight of less than about 15 gsm. For example, the coated products may have a coating weight of less than about 12 gsm, for example less than about 10 gsm. The coated products may, for example, have a coating weight of less than about 8 gsm, for example less than about 6 gsm, for example less than about 5 gsm.

The coating compositions used to prepare the coated products of the present invention may, for example, be barrier coating compositions. For example, the coating compositions may reduce or prevent the permeation of gases and/or vapours and/or liquids through the coated product. For example, the coating compositions may reduce or prevent the permeation of water vapour through the coated product (i.e. reduce the moisture vapour transmission rate of the coated product).

The coated products may, for example, have a moisture vapour transmission rate (MVTR) which is at least about 1.5 times lower than the MVTR of a corresponding product which is coated with a corresponding coating composition which does not comprise the phyllosilicate, wherein MVTR is measured at high temperature and humidity, for example 37.8° C. and 90% relative humidity. For example, the coated product may have a MVTR which is at least about 2 times lower, for example at least about 2.5 times lower, for example at least about 3 times lower than the MVTR of a corresponding product which is coated with a corresponding coating composition which does not comprise the phyllosilicate, wherein MVTR is measured at high temperature and humidity, for example 37.8° C. and 90% relative humidity. The coated products may, for example have a MVTR which is at least about 3.5 times lower than the MVTR of a corresponding product which is coated with a corresponding coating composition which does not comprise the phyllosilicate, wherein MVTR is measured at high temperature and humidity, for example 37.8° C. and 90% relative humidity. For example, the coated products may have a moisture vapour transmission rate (MVTR) which is at least about 4 times lower than the MVTR of a corresponding product which is coated with a corresponding coating composition which does not comprise the phyllosilicate, wherein MVTR is measured at high temperature and humidity, for example 37.8° C. and 90% relative humidity. For example, the coated products may have a moisture vapour transmission rate (MVTR) which is at least about 4.5 times lower than the MVTR of a corresponding product which is coated with a corresponding coating composition which does not comprise the phyllosilicate, wherein MVTR is measured at high temperature and humidity, for example 37.8° C. and 90% relative humidity.

The coated products may, for example, have a moisture vapour transmission rate (MVTR) of less than 150 gsm/day when measured according to TAPPI T464 at 37.8° C. and 90% relative humidity and using an approximately 13 gsm coatweight. For example, the coated product may have a moisture vapour transmission rate (MVTR) of less than about 130 gsm/day, for example less than about 120 gsm/day, for example less than about 100 gsm/day when measured according to TAPPI T464 at 37.8° C. and 90% relative humidity and using an approximately 13 gsm coatweight. For example, the coated products may have a MVTR of less than about 80 gsm/day, for example less than about 60 gsm/day when measured according to TAPPI T464 at 37.8° C. and 90% relative humidity and using an approximately 13 gsm coatweight. The coated products may, for example, have a MVTR of less than about 50 gsm/day when measured according to TAPPI T464 at 37.8° C. and 90% relative humidity and using an approximately 13 gsm coatweight. For example, the coated products may have a MVTR of less than about 45 gsm/day, for example less than about 40 gsm/day, for example less than about 35 gsm/day when measured according to TAPPI T464 at 37.8° C. and 90% relative humidity and using an approximately 13 gsm coatweight. For example, the coated product may have a MVTR which is less than about 30 gsm/day, for example less than about 25 gsm/day, for example less than about 20 gsm/day when measured at high temperature and high humidity, for example 37.8° C. and 90% relative humidity.

The coated products may, for example, have a moisture vapour transmission rate (MVTR) of less than about 40 gsm/day when measured at standard temperature and humidity, for example measured according to TAPPI T448 at 23° C. and 50% relative humidity and using an approximately 13 gsm coatweight. For example, the coated products may have a MVTR of less than about 35 gsm/day, for example less than about 30 gsm/day when measured at standard temperature and humidity, for example measured according to TAPPI T448 at 23° C. and 50% relative humidity and using an approximately 13 gsm coatweight. The coated products may, for example, have a MVTR of less than about 25 gsm/day when measured at standard temperature and humidity, for example measured according to TAPPI T448 at 23° C. and 50% relative humidity and using an approximately 13 gsm coatweight.

Method of Making Coating Compositions

There is provided herein a method of making a coating composition comprising combining a polymer, for example a copolymer comprising alkylene monomers and unsaturated acid monomers (e.g. an ethylene acrylic acid copolymer), and a phyllosilicate. The phyllosilicate may be as defined herein. For example, the phyllosilicate may be a platy phyllosilicate and may have a shape factor equal to or greater than about 40.

The coating compositions that may be made according to the presently disclosed method include the first aspect of the present invention and all of the embodiments disclosed herein, including all combinations and variations thereof.

The method may, for example, comprise combining (e.g. mixing), the copolymer and the phyllosilicate in an aqueous liquid medium to prepare a suspension/dispersion of the solid components therein. For example, the method may comprise combining, for example mixing, an aqueous dispersion of the copolymer with an aqueous slurry of the phyllosilicate.

The method may, for example, comprise preparing an aqueous slurry of the phyllosilicate by combining the phyllosilicate with an aqueous medium ("slurry make-down"). The slurry make-down process may, for example, include the addition of one or more additives, for example which may be selected from one or more dispersants, one or more wetting agents, one or more pH-adjusting agents. The slurry make-down process may, for example, involve dispersing the phyllosilicate in the aqueous medium at high shear, for example between 2000 and 3000 rpm. The final viscosity of the phyllosilicate slurry may, for example, range from about 200 cP (200 mPa·s) to about 400 cP (400 mPa·s). For example, the final viscosity of the phyllosilicate slurry may range from about 250 cP (250 mPa·s) to about 350 cP (350 mPa·s).

The polymer, such as an ethylene acrylic acid copolymer, and the phyllosilicate may be combined to obtain a composition having a solids content ranging from about 10 wt % to about 70 wt %, for example from about 10 wt % to about 60 wt %, for example from about 10 wt % to about 50 wt %. For example, the coating composition may have a solids content ranging from about 20 wt % to about 60 wt %, for example from about 30 wt % to about 50 wt %, for example around 45 wt %. The method may, for example, comprise dispersing the phyllosilicate (e.g. talc) into the polymer (e.g. ethylene acrylic acid). Dispersing the phyllosilicate into the polymer may, for example, give a higher solids content in comparison to an alternative method, for example the method may give a solids content in the range of about 45% to about 70%, for example from about 50% to about 70%, for example about 55% by weight of the composition.

The final viscosity of the coating composition may, for example, be such that the composition is suitably fluid for use in coating processes. The final viscosity of the coating composition may, for example, range from about 15 cP (15 mPa·s) to about 2000 cP (2000 mPa·s), for example from about 15 cP (15 mPa·s) to about 1000 cP (1000 mPa·s). For example, the final viscosity of the coating composition may range from about 30 cP (30 mPa·s) to about 2000 cP (2000 mPa·s), for example from about 30 cP (30 mPa·s) to about 1000 cP (1000 mPa·s). For example, the final viscosity of the coating composition may range from about 30 cP (30 mPa·s) to about 700 cP (mPa·s). For example, where the coating is to be applied using a blade coating process, thickeners may be added to the coating composition and the final viscosity of the coating composition may, for example, range from about 30 cP (30 mPa·s) to about 2000 cP (2000 mPa·s), for example from about 30 cP (30 mPa·s) to about 700 cP (700 mPa·s). For example, where the coating composition is to be applied using a flexo coating process, the final viscosity of the coating composition may range from about 15 cP (15 mPa·s) to about 1000 cP (1000 mPa·s), for example from about 30 cP to about 700 cP (700 mPa·s). For example, where the coating composition is to be applied using a flexo coating process, the final viscosity of the coating composition may range from about 30 cP (30 mPa·s) to about 80 cP (80 mPa·s), for example from about 30 cP (30 mPa·s) to about 50 cP (50 mPa·s). For example, the final viscosity of the coating composition may range from about 40 cP (40 mPa·s) to about 70 cP (70 mPa·s). For example, the final viscosity of the coating composition may range from about 50 cP (50 mPa·s) to about 60 cP (60 mPa·s).

Unless otherwise stated, the viscosity of the compositions is the Brookfield viscosity measured using an LV DV-E viscometer and spindle number 3, at 23° C. and 100 rpm. The viscosity of the samples are measured immediately after preparation.

The coating composition may suitably be prepared by conventional mixing techniques, as will be known to a person skilled in the art.

Method of Making Coated Products

There is provided herein a method of making a coated product comprising providing a product to be coated and coating the product with a coating composition comprising a polymer, for example a copolymer comprising alkylene monomers and unsaturated acid monomers (e.g. an ethylene acrylic acid copolymer), and phyllosilicate. The phyllosilicate may be as defined herein. For example, the phyllosilicate may have a shape factor equal to or greater than about 40.

The coating compositions used to make the coated products according to the method disclosed herein include any aspect of the present invention, including the first aspect of the present invention, and all of the embodiments disclosed herein, including all combinations and variations thereof.

The product to be coated may be any material, for example plastics, metal, textile or paper. For example, the product to be coated may be a paper product.

The coating process may be carried out using standard techniques which are known to the skilled person. The coating process may also involve calendaring or super-calendaring the coated product.

Methods of coating paper and other sheet materials, and apparatus for performing the methods, are widely published and well known. Such known methods and apparatus may conveniently be used for preparing coated paper. For example, there is a review of such methods published in Pulp and Paper International, May 1994, page 18 et seq. Sheets may be coated on the sheet forming machine, i.e., "on-machine," or "off-machine" on a coater or coating machine. Use of high solids compositions is desirable in the coating method because it leaves less water to evaporate subsequently. However, as is well known in the art, the solids level should not be an high that high viscosity and levelling problems are introduced. The methods of coating may be performed using an apparatus comprising (i) an application for applying the coating composition to the material to be coated and (ii) a metering device for ensuring that a correct level of coating composition is applied. When an excess of coating composition is applied to the applicator, the metering device is downstream of it. Alternatively, the correct amount of coating composition may be applied to the applicator by the metering device, e.g., as a film press. At the points of coating application and metering, the paper web support ranges from a backing roll, e.g. via one or two applicators, to nothing (i.e. just tension). The time the coating is in contact with the paper before the excess is finally removed is the dwell time—and this may be short, long or variable. The coating may added by a coating head at a coating station. According to the quality desired, paper grades are uncoated, single-coated, double-coated and even triple-coated. When providing more than one coat, the initial coat (precoat) may have a cheaper formulation and optionally coarser pigment in the coating composition. A coater that is applying coating on each side of the paper will have two or four coating heads, depending on the number of coating layers applied on each side. Most coating heads coat only one side at a time, but some roll coaters (e.g., film presses, gate rolls, and size presses) coat both sides in one pass.

Examples of known coaters which may be employed include, without limitation, air knife coaters, blade coaters, rod coaters, bar coaters, multi-head coaters, roll coaters, roll or blade coaters, cast coaters, laboratory coaters, gravure coaters, kisscoaters, liquid application systems, reverse roll coaters, curtain coaters, spray coaters and extrusion coaters.

Water may be added to the solids comprising the barrier coating composition or paper coating composition to give a concentration of solids which is preferably such that, when the composition is coated onto a sheet to a desired target coating weight, the composition has a rheology which is suitable to enable the composition to be coated with a pressure (i.e., a blade pressure) of between 1 and 1.5 bar.

In one embodiment, the barrier coating is printed on the paper product, e.g., printed on a surface of the fibrous substrate of the paper product. The printing may utilize a technique selected from offset printing, flexographic printing or rotogravure printing, thereby allowing the barrier coating composition or paper coating composition to be applied to areas where it is required.

Offset printing is a widely used printing technique, as will be well understood by a person of ordinary skill in the art. The barrier coating composition or paper coating composition is transferred (or "offset") from a plate to a rubber blanket, than to the surface of the substrate (e.g., paper substrate). The substrate may be sheet-fed or web-fed. The web-fed process may be heatset or coldset. Flexographic printing is a widely used printing technique, as will be well understood by a person of ordinary skill in the art. Using this technique, the barrier coating composition or paper coating composition is transferred from a first roll which is partially immersed in a tank comprising the barrier coating composition. The barrier coating composition or paper coating composition is then transferred to the anilox roll (or meter roll) whose texture holds a specific amount of the barrier coating composition or paper coating composition since it is covered with thousands of small wells or cups that enable it to meter the barrier coating composition to the printing plate in a uniform thickness evenly and quickly. The substrate is finally sandwiched between the plate and the impression cylinder to transfer the barrier coating or paper coating. The coated substrate is then fed through a dryer, which allows the coating to dry. Advantageously, flexographic printing enables the barrier coating composition or paper coating composition to be applied in a series of thin layers (e.g., a series of fiver layers with a total coat weight of about 5 gsm) which has sufficient hold out to maintain good barrier properties (to liquid and/or vapour mineral oil transmission) for barrier coating compositions comprising greater than about 60% by weight, for example, greater than about 65% by weight of inorganic particulate, based on the total dry weight of the composition. Rotogravure printing is a widely used printing technique, as will be well understood by a person of ordinary skill in the art.

The coated product may have a coating weight between about 3 gsm and about 30 gsm, for example between about 3 gsm and about 28 gsm. For example, the coated product may have a coating weight of less than about 15 gsm. For example, the coated product may have a coating weight of less than about 14 gsm, for example less than about 13 gsm. The coated product may, for example, have a coating weight of less than about 10 gsm, for example less than about 8 gsm, for example less than about 6 gsm. For example, the coated product may have a coating weight of less than about 5 gsm.

The foregoing broadly describes certain embodiments of the present invention without limitation. Variations and modifications as will be readily apparent to those skilled in the art are intended to be within the scope of the present invention as defined in and by the appended claims.

EXAMPLES

Example 1

Coating compositions were prepared using different commercially available polymer binders and either a commercially available platy talc having a shape factor of approximately 100, having 50% of particles smaller than 2 µm and a median diameter of 2.0 µm, or a commercially available non-platy talc having a shape factor of approximately 20, having 30% of particles smaller than 2 µm and a median diameter of 3.3 µm.

The shape factor of these talcs was measured as described above according to the method described in U.S. Pat. No. 5,576,617, the content of which is incorporated herein by reference.

Talc slurries were prepared by initially adding talc to an aqueous medium under high shear (about 2000 rpm) and continuing high shear dispersion at about 2500 rpm for 20 to 30 minutes. The aqueous medium comprised enough water to obtain a final solids content of about 58 wt %. The pH of the aqueous medium was adjusted to 10.5 using NaOH. The aqueous medium also comprised approximately 0.3% polyacrylate dispersant and 1.2% non-ionic polymeric wetting agent based on a block copolymer (dry weight of additive based on the dry weight of talc). The final Brookfield viscosity at 100 rpm and measured as described above, was approximately 300 cP (300 mPa·s).

Coating compositions were prepared by mixing a talc slurry with an aqueous dispersion of a polymer binder to obtain a composition having approximately 45 wt % solids. The final viscosity of the compositions was approximately 50 to 60 cP (mPa·s).

The coating compositions were then used to coat a woodfree base paper which was pre-coated with a pre-coating composition comprising calcium carbonate having at least 60% of particles smaller than 2 µm and less than 15 pph latex, the pre-coated paper having a Cobb value of less than 60 grams of water imbibed per $m^2$ when measured according to TAPPI T441 duration 1 minute. The coating was applied using a wire wound bar (K Bar) selected to give a desired coatweight. The coating composition was placed in front of the bar on a non-absorbent substrate and the bar was drawn down the substrate, coating it evenly. Hot air was then applied to the surface to dry to coating. The coating weight (gsm) was determined by weighing a sample of the coated paper and comparing it to the weight of a sample of uncoated paper.

The moisture vapour transmission rate (MVTR) of various coated and uncoated papers was determined at 23° C. and 50% relative humidity according to TAPPI T448 as described above.

The tropical moisture vapour transmission rate (tMVTR) of various coated and uncoated papers was determined at 37.8° C. and 90% relative humidity according to TAPPI T464 as described above.

The results are shown in Tables 1 and 2 below.

TABLE 1

| Coating | Coating Weight (gsm) | MVTR (gsm/day) | Tropical MVTR (gsm/day) |
|---|---|---|---|
| Styrene Butadiene | 13 | 38 | 312 |
| EAA | 13 | 23 | 156 |
| *35 wt % Styrene Butadiene polymer + 65 wt % Platy Talc | 13 | 10 | 128 |

TABLE 1-continued

| Coating | Coating Weight (gsm) | MVTR (gsm/day) | Tropical MVTR (gsm/day) |
|---|---|---|---|
| *35 wt % Styrene Butadiene polymer + 65 wt % Platy Talc | 5 | 44 | 461 |
| *35 wt % EAA copolymer + 65 wt % Platy Talc | 13 | 5 | 34 |
| *35 wt % EAA copolymer + 65 wt % Platy Talc | 5 | 21 | 119 |

*values in wt % refer to the solids content of the coating composition.

TABLE 2

| Coating | Coating Weight | Tropical MVTR (gsm/day) |
|---|---|---|
| None | — | 1710 |
| LDPE | 18 µm Film | 50 |
| EAA copolymer | 13 gsm | 156 |
| *35 wt % EAA copolymer + 65 wt % Platy Talc | 13 gsm | 34 |
| *35 wt % EAA copolymer + 65 wt % Non-Platy Talc | 13 gsm | 358 |
| Styrene Butadiene polymer | 13 gsm | 312 |
| *35 wt % Styrene Butadiene polymer + 65 wt % Platy Talc | 13 gsm | 128 |
| *35 wt % Styrene Butadiene polymer + 65 wt % Non-Platy Talc | 13 gsm | 416 |
| *Styrene Acrylic polymer | 13 gsm | 380 |
| *35 wt % Styrene Acrylic polymer + 65 wt % Platy Talc | 13 gsm | 125 |
| PVDC (polyvinyldiene chloride) | 13 gsm | 275 |
| *35 wt % PVDC + 65 wt % Platy Talc | 13 gsm | 222 |

*values in wt % refer to the solids content of the coating composition

It was surprisingly found that there was a greater improvement in MVTR and jMVTR when using coating compositions comprising a copolymer comprising alkylene monomers and unsaturated acid monomers (i.e. EAA) and platy talc in comparison to coating compositions comprising different polymers with platy talc. For example, the tMVTR when using a composition comprising EAA and platy talc was improved by 4.6 times, whereas the tMVTR of coating compositions comprising styrene butadiene polymer, styrene acrylic acid polymer and PVDC with platy talc in comparison to compositions comprising only the polymer only improved by 2.4 times, 3 times and 1.2 times respectively.

The foregoing broadly describes certain embodiments of the present invention without limitation. Variations and modifications as will be readily apparent to those skilled in the art are intended to be within the scope of the present invention as defined in and by the appended claims.

The following numbered paragraphs define particular embodiments of the present invention 1. A coating composition comprising:
    a copolymer comprising alkylene monomers and unsaturated acid monomers; and
    at least one phyllosilicate having a shape factor equal to or greater than about 40.

2. The coating composition of paragraph 1, wherein the alkylene monomers are ethylene monomers.
3. The coating composition of paragraph 1 or 2, wherein the unsaturated acid monomers are acrylic acid monomers.
4. The coating composition of any one of paragraphs 1 to 3, wherein at least 30% of the acid groups on the copolymer are neutralized.
5. The coating composition of any one of paragraphs 1 to 4, wherein the coating composition is an aqueous dispersion.
6. The coating composition of any one of paragraphs 1 to 5, wherein the at least one phyllosilicate has a shape factor equal to or greater than about 50, for example equal to or greater than about 75, for example equal to or greater than about 100.
7. The coating composition of any one of paragraphs 1 to 6, wherein the at least one phyllosilicate is talc.
8. The coating composition of any one of paragraphs 1 to 7, wherein the at least one phyllosilicate is kaolin.
9. The coating composition of any one of paragraphs 1 to 8, wherein the copolymer is present in an amount ranging from about 10% to about 80% by weight of the dry composition.
10. The coating composition of any one of paragraphs 1 to 9, wherein the copolymer is present in an amount ranging from about 10% to about 60% by weight of the dry composition.
11. The coating composition of any one of paragraphs 1 to 10, wherein the at least one phyllosilicate is present in an amount ranging from about 20% to about 90% by weight of the dry composition
12. The coating composition of any one of paragraphs 1 to 11, wherein the at least one phyllosilicate is present in an amount ranging from about 40% to about 90% by weight of the dry composition.
13. The coating composition of any one of paragraphs 1 to 12, wherein the coating composition has a moisture vapour transmission rate (MVTR) which is at least about 3.5 times lower than the MVTR of a corresponding coating composition of any one of paragraphs 1 to 12 which does not comprise the phyllosilicate, wherein MVTR is measured at 37.8° C. and 90% relative humidity.
14. The coating composition of any one of paragraphs 1 to 13, wherein the coating composition has a moisture vapour transmission rate (MVTR) which is at least about 4 times lower than the MVTR of a corresponding coating composition of any one of paragraphs 1 to 13 which does not comprise the phyllosilicate, wherein MVTR is measured at 37.8° C. and 90% relative humidity.
15. The coating composition of any one of paragraphs 1 to 14, wherein the moisture vapour transmission rate (MVTR) of the coating composition is less than about 100 gsm/day when measured according to TAPPI T464 at 37.8° C. and 90% relative humidity, using an approximately 13 gsm coatweight of the coating composition of any one of paragraphs 1 to 14 on a woodfree base paper, wherein the base paper is pre-coated with a pre-coating composition comprising calcium carbonate having at least 60% of particles smaller than 2 µm and less than 15 pph latex, and the pre-coated paper has a Cobb value of less than 60 grams of water imbibed per m² when measured according to TAPPI T441 duration 1 minute.

16. The coating composition of any one of paragraphs 1 to 15, wherein the moisture vapour transmission rate (MVTR) of the coating composition is less than about 40 gsm/day when measured according to TAPPI T448 at 23° C. and 50% relative humidity, using a 13 gsm coatweight of the coating composition of any one of paragraphs 1 to 15 on a woodfree base paper, wherein the base paper is pre-coated with a pre-coating composition comprising calcium carbonate having at least 60% of particles smaller than 2 μm and less than 15 pph latex, and the pre-coated paper has a Cobb value of less than 60 grams of water imbibed per m² when measured according to TAPPI T441 duration 1 minute.

17. A product coated with a coating composition of any one of paragraphs 1 to 16.

18. The product of paragraph 17, wherein the product is a paper product.

19. The product of paragraph 17 or 18, wherein the coated product has a coating weight of equal to or less than about 15 gsm, for example equal to or less than about 10 gsm, for example equal to or less than about 5 gsm.

20. The product of any one of paragraphs 17 to 19, wherein the product has a moisture vapour transmission rate (MVTR) which is at least about 3.5 times lower than the MVTR of a corresponding product of any one of paragraphs 17 to 19 coated with a corresponding coating composition of any one of paragraphs 1 to 16 which does not comprise the at least one phyllosilicate, wherein MVTR is measured at 37.8° C. and 90% relative humidity.

21. The product of any one of paragraphs 17 to 20, wherein the product has a moisture vapour transmission rate (MVTR) which is at least about 4 times lower than the MVTR of a corresponding product of any one of paragraphs 17 to 20 coated with a corresponding coating composition of any one of paragraphs 1 to 16 which does not comprise the at least one phyllosilicate, wherein MVTR is measured at 37.8° C. and 90% relative humidity.

22. The product of any one of paragraphs 17 to 21, wherein the moisture vapour transmission rate (MVTR) of the product is less than about 100 gsm/day when measured according to TAPPI T464 at 37.8° C. and 90% relative humidity and using an approximately 13 gsm coatweight.

23. The product of any one of paragraphs 17 to 22, wherein the moisture vapour transmission rate (MVTR) of the product is less than about 40 gsm/day when measured according to TAPPI T448 at 23° C. and 50% relative humidity and using an approximately 13 gsm coatweight.

24. A method of making a coating composition of any one of paragraphs 1 to 16, comprising combining an alkylene/unsaturated acid copolymer and at least one phyllosilicate having a shape factor equal to or greater than about 40.

25. A method of making a coated product, comprising:
providing a product to be coated; and
coating the product with a composition of any one of paragraphs 1 to 16.

26. The method of paragraph 25, wherein the product is a paper product.

The invention claimed is:
1. A coating composition comprising:
a copolymer comprising alkylene monomers and unsaturated acid monomers; and
at least one phyllosilicate having a shape factor equal to or greater than about 40,
wherein at least 30% of the acid groups on the copolymer are neutralized.

2. The coating composition of claim 1, wherein
(a) the alkylene monomers are ethylene monomers; and/or
(b) the unsaturated acid monomers are acrylic acid monomers.

3. The coating composition of claim 1, wherein the at least one phyllosilicate has a shape factor equal to or greater than about 50.

4. The coating composition of claim 1, wherein the at least one phyllosilicate is selected from talc, kaolin or a combination thereof.

5. The coating composition of claim 1, wherein the copolymer is present in an amount ranging from about 10% to about 80% by weight of the dry composition.

6. The coating composition of claim 1, wherein the coating composition has a moisture vapour transmission rate (MVTR) which is at least about 1.5 times lower than the MVTR of a corresponding coating composition which does not comprise the phyllosilicate, wherein MVTR is measured at 37.8° C. and 90% relative humidity.

7. The coating composition of claim 1, wherein the moisture vapour transmission rate (MVTR) of the coating composition is less than about 150 gsm/day when measured according to TAPPI T464 at 37.8° C. and 90% relative humidity, using an about 13 gsm coatweight of the coating composition on a base paper coated with a pre-coating, wherein the coatweight of the pre-coating is equal to or greater than about 12 gsm.

8. A coating composition comprising:
a polymer; and
at least one phyllosilicate having a shape factor equal to or greater than about 40;
wherein the moisture vapour transmission rate (MVTR) of the coating composition is less than about 150 gsm/day, for example less than about 100 gsm/day, when measured according to TAPPI T464 at 37.8° C. and 90% relative humidity, using an about 13 gsm coatweight of the coating composition, and wherein at least 30% of the acid groups on the copolymer are neutralized.

9. The coating composition of claim 8, wherein the coating composition has a Cobb value of less than about 30 gsm when measured according to TAPPI T441 duration 1 minute using an approximately 9 gsm coatweight of the coating composition.

10. The coating composition of claim 9, wherein the MVTR or Cobb value is measured using a base paper coated with a pre-coating, wherein the coatweight of the pre-coating is equal to or greater than about 12 gsm.

11. The coating composition of claim 8, wherein the polymer is selected from styrene butadiene, ethylene acrylic acid, polyethylene terephthalate, styrene acrylic latex and any combination thereof.

12. A product, for example a paper product, coated with a coating composition of claim 1.

13. The product of claim 12, wherein the moisture vapour transmission rate (MVTR) of the product is less than about 150 gsm/day when measured according to TAPPI T464 at 37.8° C. and 90% relative humidity and using an approximately 13 gsm coatweight.

14. A method of making a coating composition of claim 1, comprising combining a polymer and at least one phyllosilicate having a shape factor equal to or greater than about 40.

15. A method of making a coated product comprising: providing a product to be coated; and coating the product with a composition of claim 1.

16. The coating composition of claim 5, wherein the copolymer is present in an amount ranging from about 10% to about 60% by weight of the dry composition and the at least one phyllosilicate is present in an amount ranging from about 40% to about 90% by weight of the dry composition.

17. The coating composition of claim 5, wherein the at least one phyllosilicate is present in an amount ranging from about 20% to about 90% by weight of the dry composition.

18. The coating composition of claim 6, wherein the coating composition has a moisture vapour transmission rate (MVTR) which is at least about 2.5 times lower than the MVTR of a corresponding coating composition which does not comprise phyllosilicate.

19. The coating composition of claim 6, wherein the coating composition has a moisture vapour transmission rate (MVTR) which is at least about 3.5 times lower than the MVTR of a corresponding coating composition which does not comprise phyllosilicate.

20. The coating composition of claim 1, wherein the coating composition is a barrier coating.

\* \* \* \* \*